(12) United States Patent
Qi et al.

(10) Patent No.: US 9,962,654 B2
(45) Date of Patent: May 8, 2018

(54) PEROVSKITE BASED OXYGEN STORAGE MATERIALS

(71) Applicant: GM Global Technology Operations LLC, Detroit, MI (US)

(72) Inventors: Gongshin Qi, Troy, MI (US); John T. Johnson, Sterling Heights, MI (US); Se H. Oh, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/044,444

(22) Filed: Feb. 16, 2016

(65) Prior Publication Data

US 2017/0232387 A1  Aug. 17, 2017

(51) Int. Cl.
*B01J 23/10*   (2006.01)
*B01J 23/34*   (2006.01)
(Continued)

(52) U.S. Cl.
CPC ............ *B01D 53/945* (2013.01); *B01J 23/10* (2013.01); *B01J 23/34* (2013.01); *B01J 23/42* (2013.01);
(Continued)

(58) Field of Classification Search
CPC ... B01J 23/10; B01J 23/34; B01J 23/42; B01J 23/44; B01J 23/464; B01J 23/63; B01J 23/83; B01J 23/894; B01J 23/8946
See application file for complete search history.

(56) References Cited

U.S. PATENT DOCUMENTS 4,921,829 A * 5/1990 Ozawa ................ B01D 53/945
423/213.5
5,185,311 A * 2/1993 Tabata ................ B01D 53/864
423/213.2
(Continued)

FOREIGN PATENT DOCUMENTS

EP         0827775         3/1998

OTHER PUBLICATIONS

"Catalytic Converter"; Umicore, Materials for a better life; (http://www.preciousmetals.umicore.com/).
(Continued)

*Primary Examiner* — Cam N. Nguyen
(74) *Attorney, Agent, or Firm* — Cynthia R. Parks; Parks IP Law LLC

(57) ABSTRACT

The present technology relates to perovskite materials for oxygen storage. In one aspect, the perovskite material includes at least one platinum group metal (PGM) and at least one perovskite compound selected from the group consisting of formula (a): $La_xMO_3$ and formula (b): $La_{(1-y)}Sr_yMO_3$, wherein: M is selected from the group consisting of Co, Cu, Fe, Mn and Ni; x is about 0.7 to about 1.1; and y is 0 to about 0.8, and wherein M, x, and y are independently variable for each one of said perovskite compounds. In one exemplary method, the perovskite materials of the technology are employed to treat automotive exhaust gas. In one embodiment, the perovskite materials are included in the washcoat of an automotive catalytic converter.

19 Claims, 3 Drawing Sheets

(51) Int. Cl.
    *B01J 23/42*     (2006.01)
    *B01J 23/44*     (2006.01)
    *B01J 23/63*     (2006.01)
    *B01J 23/83*     (2006.01)
    *B01D 53/94*     (2006.01)
    *B01J 23/46*     (2006.01)

(52) U.S. Cl.
    CPC ............ B01J 23/44 (2013.01); B01J 23/464 (2013.01); B01J 23/83 (2013.01); *B01D 2255/1021* (2013.01); *B01D 2255/1023* (2013.01); *B01D 2255/1025* (2013.01); *B01D 2255/204* (2013.01); *B01D 2255/2063* (2013.01); *B01D 2255/2073* (2013.01); *B01D 2255/20738* (2013.01); *B01D 2255/40* (2013.01); *B01D 2255/402* (2013.01); *B01D 2255/407* (2013.01); *B01D 2255/908* (2013.01); *Y02T 10/22* (2013.01)

(56) References Cited

U.S. PATENT DOCUMENTS

| | | | | |
|---|---|---|---|---|
| 5,939,354 | A * | 8/1999 | Golden | B01D 53/945 502/302 |
| 5,977,017 | A * | 11/1999 | Golden | B01D 53/945 502/302 |
| 6,129,862 | A * | 10/2000 | Munakata | B01D 53/945 252/519.15 |
| 6,352,955 | B1 * | 3/2002 | Golden | B01D 53/945 423/263 |
| 6,395,675 | B1 * | 5/2002 | Suga | B01D 53/945 502/302 |
| 6,521,202 | B1 * | 2/2003 | Vaughey | B01J 23/002 423/599 |
| 6,531,425 | B2 * | 3/2003 | Golden | B01D 53/945 502/302 |
| 6,569,803 | B2 * | 5/2003 | Takeuchi | B01D 53/9422 502/325 |
| 7,375,054 | B2 * | 5/2008 | Eguchi | B01J 23/002 423/210 |
| 7,572,751 | B2 * | 8/2009 | Isogai | B01D 53/945 502/302 |
| 7,795,170 | B2 * | 9/2010 | Tanaka | B01J 23/002 502/304 |
| 8,409,518 | B2 * | 4/2013 | Kim | B01D 53/944 422/177 |
| 8,466,083 | B2 * | 6/2013 | Schmieg | B01D 53/9418 422/171 |
| 8,513,155 | B2 * | 8/2013 | Li | B01D 53/9422 422/177 |
| 8,765,092 | B2 * | 7/2014 | Qi | B01J 23/34 423/213.2 |
| 8,974,764 | B2 * | 3/2015 | Ifrah | B01J 23/002 423/593.1 |
| 8,999,878 | B2 * | 4/2015 | Takeshima | B01D 53/945 502/100 |
| 9,216,408 | B2 * | 12/2015 | Nazarpoor | B01J 23/83 |
| 9,352,301 | B2 * | 5/2016 | Ito | B01D 53/9413 |
| 2010/0227758 | A1 * | 9/2010 | Yang | B01D 53/945 502/303 |
| 2012/0180453 | A1 | 7/2012 | Blint et al. | |
| 2015/0148219 | A1 * | 5/2015 | Ifrah | B01J 23/002 502/303 |

OTHER PUBLICATIONS

Gongshin Qi et al.; "Pt-free, Perovskite-based Lean NOx Trap Catalysts"; GM Global Research & Development, 2010 DEER Conference.

Sylvain Keav et al.; "Structured Perovskite-Based Catalysts and Their Application as Three-Way Catalytic Converters—A Review"; Catalysts 2014, vol. 4, pp. 226-255; doi:10.3390/catal4030226; (www.mdpi.com/journal/catalysts).

* cited by examiner

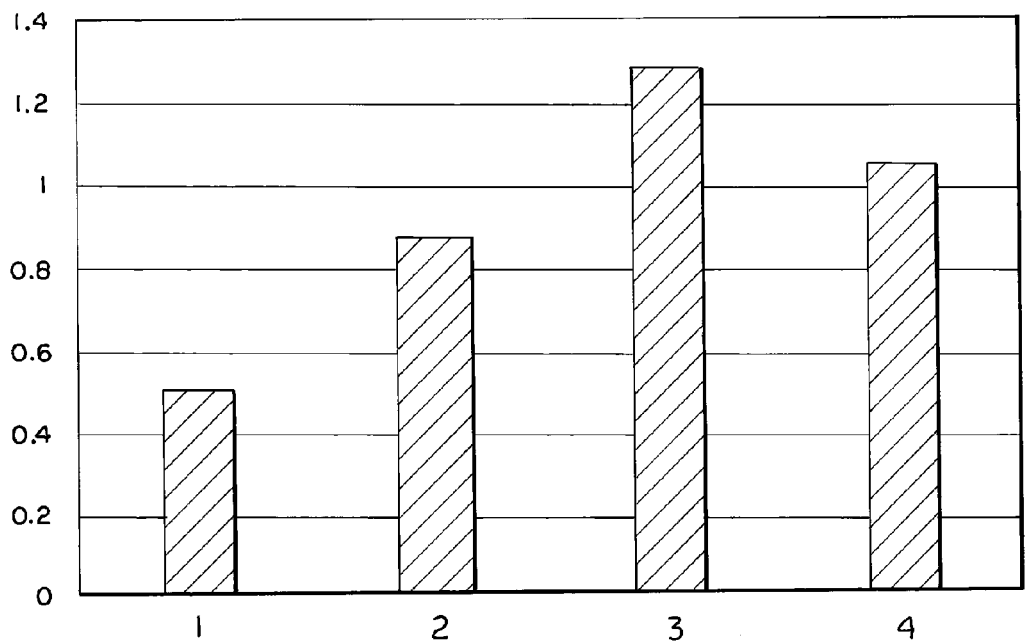
Fig_1
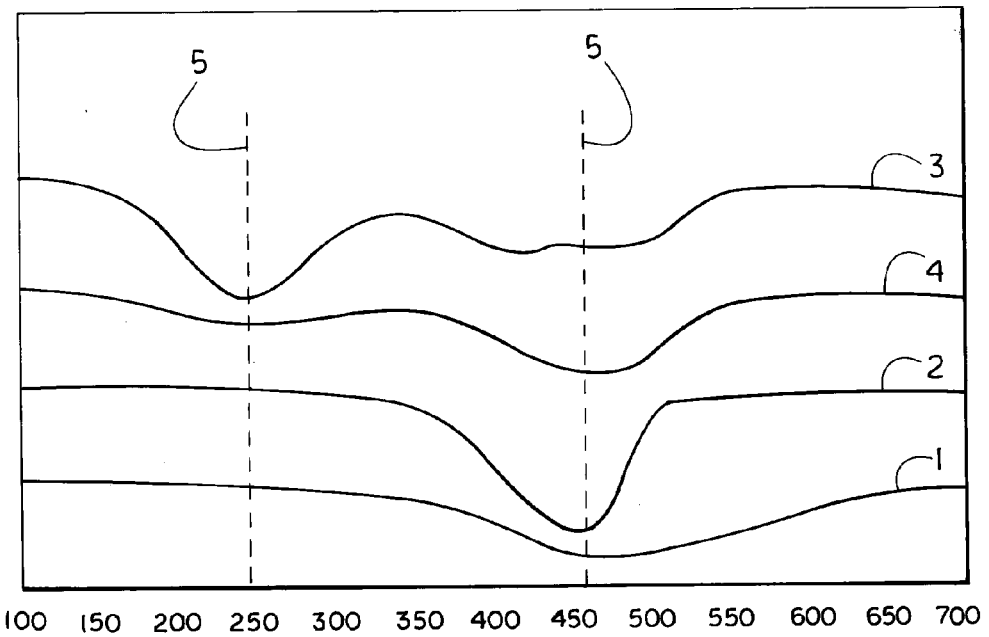
Fig_2

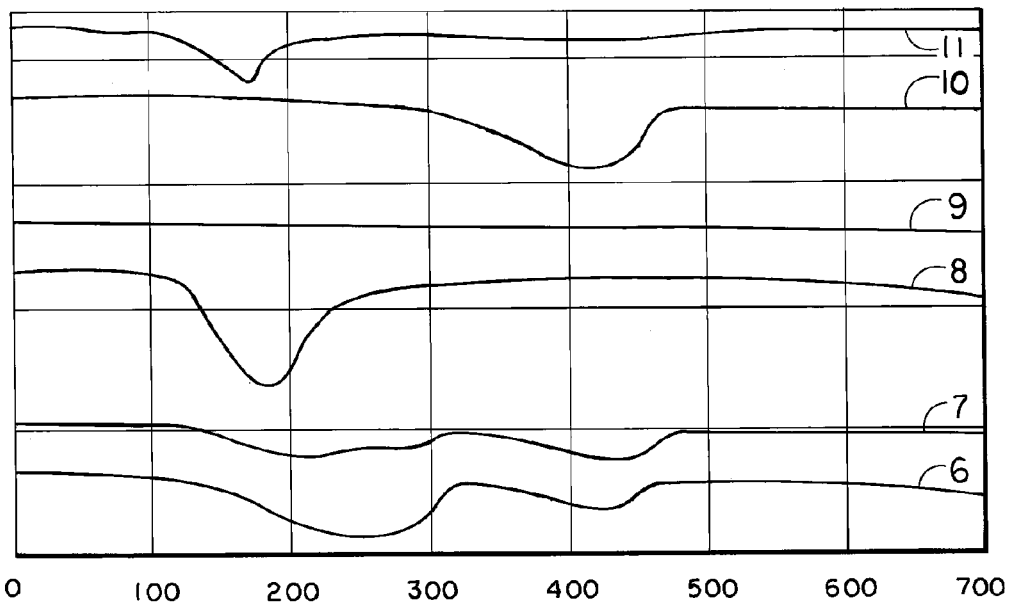
Fig_3
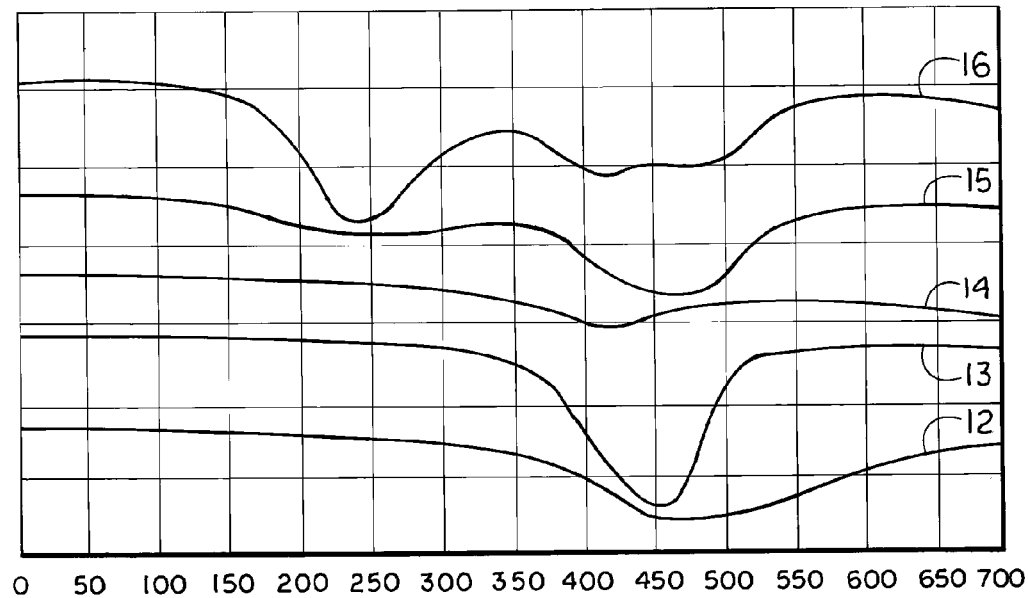
Fig_4

PEROVSKITE BASED OXYGEN STORAGE MATERIALS

BACKGROUND

Three way catalytic (TWC) converters are employed in gasoline powered internal combustion engines to reduce the level of environmentally toxic hydrocarbon (HC), carbon monoxide, and nitrogen oxide gases in the exhaust. The TWC converters perform the tasks of reducing nitrogen oxides to nitrogen and water, and oxidizing carbon monoxide and HC to carbon dioxide, and carbon dioxide and water, respectively. TWC converters operate most effectively when the engine is operated within a narrow range of air-fuel ratios (AFR), and engines are typically cycled between excess fuel, "rich" AFR conditions, and excess oxygen "lean" AFR conditions. Oxygen storage materials, such as cerium oxide, are utilized in TWC converters to store and release oxygen as the engine is cycled between lean and rich operating conditions. Ceria, in combination with platinum group metals (PGM), have been used in materials for storage and release of oxygen to improve conversion performance of TWC under cycled AFR conditions. However, cerium is a rare earth element whose supply is variable, and it's price and availability may be subject to wide price fluctuations.

Accordingly, alternative oxygen storage materials would be useful to replace ceria based materials currently in use.

SUMMARY OF THE TECHNOLOGY

The presently disclosed technology provides, in a general aspect, perovskite materials for oxygen storage. The perovskite materials are particularly useful for oxygen storage in an automotive three-way catalyst. In one aspect, the perovskite material includes at least one platinum group metal (PGM) and at least one perovskite compound selected from the group consisting of formula (a): $La_xMO_3$ and formula (b): $La_{(1-y)}Sr_yMO_3$, wherein:

M is selected from the group consisting of Co, Cu, Fe, Mn and Ni;

x is about 0.7 to about 1.1; and y is 0 to about 0.8, and wherein M, x, and y are independently variable for each one of said perovskite compounds.

In one embodiment, the perovskite material includes a PGM selected from the group consisting of Pt, Pd and Rh.

In one exemplary method, the perovskite materials of the technology are employed to treat automotive exhaust gas. In one embodiment, the perovskite materials are included in the washcoat of an automotive catalytic converter.

BRIEF DESCRIPTION OF THE DRAWINGS

FIG. 1 shows a bar graph comparison of oxygen storage capacity (mmol $O_2$/g perovskite based material) for perovskite based materials of the instant technology and a cerium based commercial catalyst (Pd/CeZrO$_x$).

FIG. 2 shows a graphical comparison of hydrogen consumption versus temperature for perovskite based materials of the technology and a commercial cerium based catalyst as measured using temperature programmed reduction by $H_2(g)$ ($H_2$-TPR).

FIG. 3 shows $H_2$-TPR graphs for Pd doped samples (fresh).

FIG. 4 shows $H_2$-TPR graphs for Pd doped samples (aged).

DETAILED DESCRIPTION OF THE TECHNOLOGY

Figure 5:
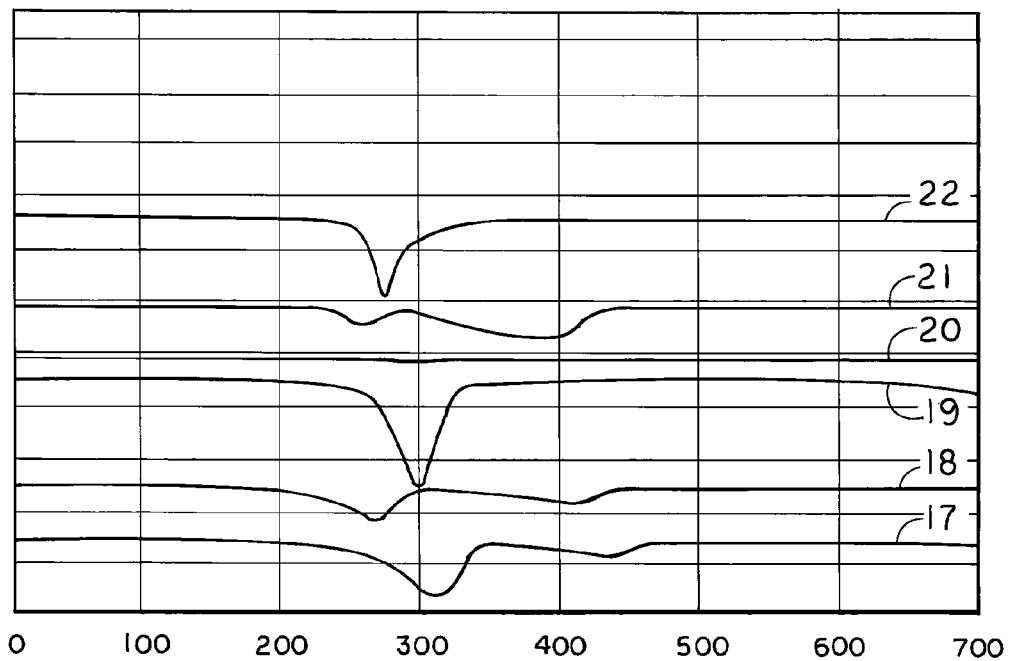
FIG. 5 shows $H_2$-TPR graphs for Pt doped samples (fresh).

The present disclosure will now be described more fully hereinafter with reference to the accompanying Drawings, in which some exemplary embodiments of the technology are shown. This technology may, however, be embodied in many different forms and should not be construed as limited to the embodiments set forth herein. Rather, these embodiments are provided so that this disclosure will be thorough and complete, and will fully convey the scope of the technology to those skilled in the art.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The perovskite materials of the instant technology are useful for oxygen storage, including for oxygen storage in an automotive three-way catalyst. As shown in FIG. 1, perovskite materials of the instant technology (2:Pd/La$_{0.9}$FeO$_3$; 3:Pd/La$_{0.6}$Sr$_{0.4}$FeO$_3$; and 4:Pd/La$_{0.8}$Sr$_{0.2}$FeO$_3$) exhibit at least 1-2 times higher oxygen storage capacity as compared to a commercial cerium based catalyst (1:Pd/CeZrO$_x$). Due to higher oxygen storage capacity, lower levels of perovskite materials as compared to cerium based materials could be utilized to meet the oxygen storage requirements of catalytic converter washcoats. Furthermore, due to lower oxygen release temperatures, the perovskite materials of the instant technology are useful for providing higher catalyst performance at low temperature relative to ceria based commercial materials. The materials of the instant technology may advantageously be used to meet emission standards at lower cost.

In one aspect, the perovskite material of the instant technology includes at least one platinum group metal (PGM) and at least one perovskite compound selected from the group consisting of formula (a): $La_xMO_3$ and formula (b): $La_{(1-y)}Sr_yMO_3$, wherein:

M is selected from the group consisting of Co, Cu, Fe, Mn and Ni;

x is about 0.7 to about 1.1; and y is 0 to about 0.8, and wherein M, x, and y are independently variable for each one of said perovskite compounds.

In one embodiment of the technology, the perovskite material includes a PGM and a strontium doped perovskite compound of general formula $La_{(1-y)}Sr_yMO_3$, wherein y is about 0.2 to about 0.4. In another embodiment, the perovskite compound has the formula $La_xMO_3$, wherein x is about 0.7 to about 1.1.

In various embodiments, M in the perovskite compounds is Fe. In various embodiments, at least one of the perovskite compounds is selected from $La_xFeO_3$ and $La_xMnO_3$.

By PGM is meant platinum-group metals as understood conventionally in the art to mean certain transition metals in the d-block of the periodic table. In an exemplary embodiment, the PGM of the instant technology is selected from at least one of the group of elements consisting of Pt, Pd and Rh. In one embodiment, the perovskite material of the technology includes at least one of the aforementioned perovskite compounds, $La_xMO_3$ or $La_{(1-y)}Sr_yMO_3$, and at least one PGM selected from the group consisting of Pt, Pd and Rh. In various embodiments, the PGM is preferably Pd or Rh.

In one embodiment, the perovskite material of the technology contains only one type of PGM. In another embodiment, more than one type of PGM may be associated with a perovskite compound. In yet another embodiment, both Pd and Rh are contained in the perovskite materials of the technology, and the perovskite compound associated with Pd and Rh may be one compound or may be more than one compound.

In one exemplary method, the perovskite materials of the technology are employed to treat automotive exhaust gas. The method includes a first step of providing at least one perovskite material, and in a second step exposing the perovskite material to exhaust gas to treat the gas. By "treat the gas" is meant that the components of the exhaust gas are converted from harmful and/or toxic gases to less harmful gases, such as is done by a three-way catalytic converter. Three-way catalytic converters transform exhaust gases that are considered detrimental to the environment, including hydrocarbons, carbon monoxide and nitrogen oxides, to carbon dioxide, nitrogen and water by way of redox reaction. Upon contact with exhaust gas, the perovskite materials of the instant technology catalyze the redox reactions, and absorb and release oxygen so as to increase the efficiency of the gas conversion. As would be understood by one skilled in the art, it is desirable to have an ideal mixture of oxygen and the exhaust gases to be treated, that is, a so-called stoichiometric mixture. When there is too much oxygen present, nitrogen oxide conversion will drop; when there is too little oxygen, carbon monoxide conversion drops. Oxygen storage materials act as a buffer for oxygen levels. When there is too much oxygen present, the oxygen storage materials within a TWC absorb the oxygen. When there is too little oxygen present, the oxygen storage materials release oxygen. The amount of oxygen needed is a function of the composition of the exhaust gases, and fluctuations in the amounts and types of gases in the engine exhaust can have variable causes, such as vehicle acceleration and de-acceleration. The higher the storage capacity of a material, the less the amount of oxygen storage material needed to buffer the oxygen levels.

In one embodiment, perovskite materials according to the instant technology are included in the washcoat of an automotive catalytic converter. A single perovskite material may be provided in the washcoat, or different perovskite materials may be provided in the washcoat. The different materials may be different in that they contain different PGMs, different perovskite compounds, or both. The perovskite materials may be dispersed in a washcoat formulation wherein the formulation is chosen so as to facilitate dispersion of the materials suspended in the washcoat formulation over a large surface area of a substrate. The process of applying a washcoat to a substrate is termed "washcoating". Typical washcoat substrates in TWCs are cordierite ceramic materials with a honeycomb structure. A metallic substrate is an alternative to the cordierite substrate. The PGM and perovskite compounds of the instant technology may be applied to the substrate together, or they may be applied to the substrate separately. For instance, the PGM may be washcoated onto the substrate first, such as in the form of a slurry, and the perovskite compound may be subsequently delivered to the PGM coated substrate. A reverse application procedure is also viable, wherein the perovskite compound is applied to the substrate first, and the PGM is applied thereafter.

The examples below serve to further illustrate the technology, to provide those of ordinary skill in the art with a complete disclosure and description of how the compounds, compositions, articles, devices, and/or methods claimed herein are made and evaluated, and are not intended to limit the scope of the technology. In the examples, unless expressly stated otherwise, amounts and percentages are by weight, temperature is in degrees Celsius or is at ambient temperature, and pressure is at or near atmospheric.

EXAMPLES

Preparation of PGM Doped Perovskites

Listed in Table 1 are exemplary PGM-containing perovskite based oxygen storage materials according to the technology, LF, LF90, LSF20, LSF40, LM90, and a compound containing mixed oxides of La, Ce, Nd, and Zr (GMR5). The PGM based perovskite materials were prepared by impregnating the perovskite powder compounds with various PGM solutions by the incipient wetness method. The wetted supports were then dried overnight and calcined at 550° C. for one hour. PGM containing powders required 0.0114% Pd, 0.0046% Pt, or 0.0009% Rh. The Pd-containing powders were prepared with a palladium nitrate stock solution (0.1797 g Pd/g solution). The Pt-containing powders were prepared with a chloroplatinic acid stock solution (0.1464 g Pt/g solution). The Rh-containing powders were prepared with a rhodium nitrate stock solution (0.0731 g Rh/g solution).

Prior to testing, some samples were aged at 950° C. for 50 hours using a burner aging protocol (feed stream of 10%

$CO_2$ and 10% $H_2O$, with 5 second pulses of 3% $O_2$ and 3% CO every 3 minutes in nitrogen) to simulate 120,000 miles aging.

TABLE 1

Reference &Perovskite Based Oxygen Storage Compounds

| Samples | Surface area ($m^2$/g) | Particle size (μm) (d50)[1] |
|---|---|---|
| $LaFeO_3$ (LF) | 8.9 | 0.71 (d50) |
| $La_{0.9}FeO_3$ (LF90) | 8.9 | 0.69 (d50) |
| $La_{0.8}Sr_{0.2}FeO_3$ (LSF20) | 8.1 | 0.72 (d50) |
| $La_{0.6}Sr_{0.4}FeO_3$ (LSF40) | 9.3 | 0.71 (d50) |
| $La_{0.9}MnO_3$ (LM90) | 7.2 | 0.82 (d50) |
| GMR5 (Reference Sample) | | |

Note 1: d50 = median diameter, also known as mass-median-diameter

FIG. 2 depicts representative $H_2$-TPR graphs wherein the signal intensity (in arbitrary units) representing hydrogen consumption is shown on the vertical y-axis as a function of temperature (in degrees Celsius), which is shown on the horizontal x-axis, and the oxygen release temperature 5 (also called the "peak temperature") is indicated thereon for select curves. Curves from the $H_2$-TPR measurements for the PGM-doped perovskites of the technology as compared to curves for a reference standard (GMR5) are depicted in FIG. 3-FIG. 6.

The $H_2$ consumption and the peak temperature(s) for PGM-doped perovskites as compared to the PGM-GMR5 reference sample are shown in Tables 2-4, wherein the Sample ID# corresponds to the curve ID# in FIG. 3-FIG. 6.

TABLE 2

H2-TPR Data for Pd Doped Samples (Fresh and Aged)

| Samples, Sample ID# | Fresh Samples (FIG. 3) | | Aged Samples (50 h, 950° C.) (FIG. 4) | |
|---|---|---|---|---|
| | $H_2$ consumption (cc/g STP) | Peak temp. (° C.) | $H_2$ consumption (cc/g STP) | Peak temp. (° C.) |
| Pd/GMR5, 11(fresh); 12(aged) | 14.24 | 175 | 11.36 | 473 |
| Pd/LF90 ($La_{0.9}FeO_3$), 10(fresh); 13(aged) | 12.20 | 425 | 19.53 | 450 |
| Pd/LF ($LaFeO_3$), 9(fresh); n.d.(aged) | 1.0 | N/A | n.d. | n.d. |
| Pd/LSF40 ($La_{0.6}Sr_{0.4}FeO_3$), 6(fresh); 16(aged) | 22.13 | 250, 430 | 28.60 | 250, 450 |
| Pd/LSF20 ($La_{0.8}Sr_{0.2}FeO_3$), 7(fresh); 15(aged) | 13.44 | 200, 440 | 23.14 | 250, 466 |
| Pd/LM90 ($La_{0.9}MnO_3$), 8(fresh); 14(aged) | 20.52 | 188 | 3.0 | 420 |

Oxygen Storage Capacity Measurement

Oxygen storage capacity was measured by temperature programmed reduction by $H_2$ gas ($H_2$-TPR), which is a titration reaction between the mobile oxygen in the material and gaseous $H_2$. Using this method, hydrogen is used to reduce the sample, and the amount of hydrogen consumed is related to oxygen storage. The peak area is used to characterize the amount of mobile oxygen available in the sample, wherein the magnitude of the peak area correlates with the magnitude of the oxygen storage capacity. The temperature that is associated with the highest negative inflection of a peak, called the "peak temperature", is an indication of the mobility of the oxygen of the material, wherein lower temperature represents higher mobility of the oxygen of the material.

$H_2$-TPR measurements were carried out on a commercial instrument (Micromeritics, Autochem2920) with a TCD detector. Before the $H_2$-TPR measurements, the samples were pre-oxidized at 500° C. followed by helium flow to purge the residual gaseous and weakly adsorbed oxygen. The temperature programmed reduction profile was measured in a flow of 10 vol. % $H_2$/Ar (30 ml/min) from room temperature to 800° C. at a rate of 10° C./min.

TABLE 3

H2-TPR Data for Pt Doped Samples (Fresh)

| FIG. 5 Samples, Sample ID# | $H_2$ consumption (cc/g STP) | Peak temperature (° C.) |
|---|---|---|
| Pt/GMR5, 22 | 12.89 | 280 |
| Pt/LF90 ($La_{0.9}FeO_3$), 21 | 16.02 | 260, 400 |
| Pt/LF ($LaFeO_3$), 20 | 1.08 | N/A |
| Pt/LSF40 ($La_{0.6}Sr_{0.4}FeO_3$), 17 | 7 | 316, 440 |
| Pt/LSF20 ($La_{0.8}Sr_{0.2}FeO_3$), 18 | 15.04 | 270, 415 |
| Pt/LM90 ($La_{0.9}MnO_3$), 19 | 21.88 | 300 |

TABLE 4

H2-TPR Data for Rh Doped Samples (Fresh)

Figure 6:
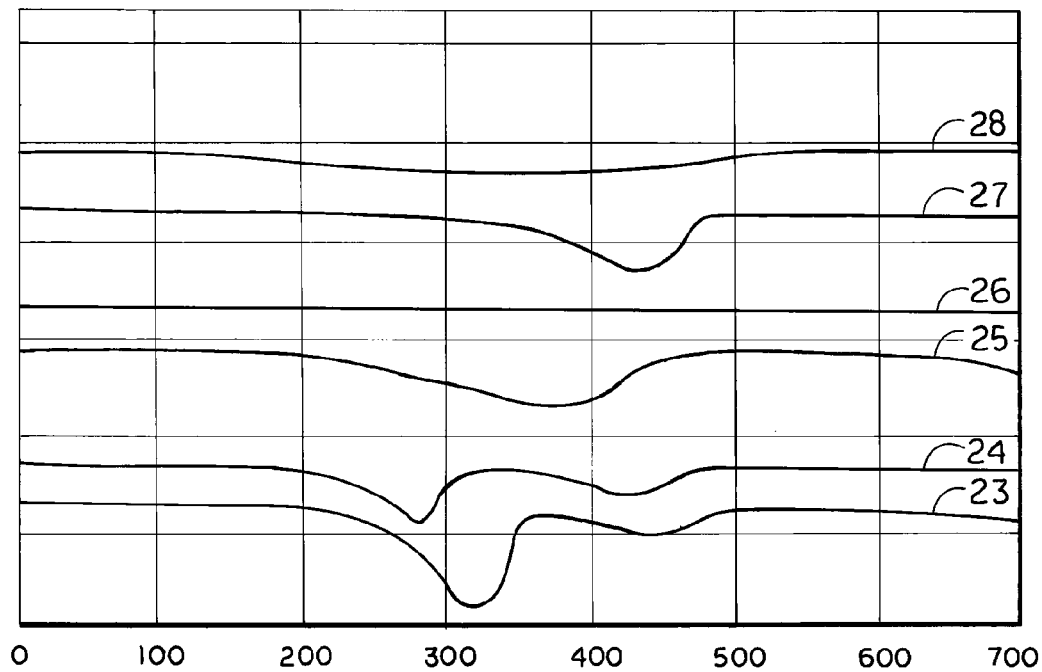
FIG. 6 shows $H_2$-TPR graphs for Rh doped samples (fresh).

| FIG. 6 Samples, Sample ID# | H$_2$ consumption (cc/g STP) | Peak temperature (° C.) |
|---|---|---|
| Rh/GMR5, 28 | 14.03 | 250 |
| Rh/LF90 (La$_{0.9}$FeO$_3$), 27 | 1.26 | N/A |
| Rh/LF (LaFeO$_3$), 26 | 15.30 | 442 |
| Rh/LSF40 (La$_{0.6}$Sr$_{0.4}$FeO$_3$), 23 | 25.50 | 324, 450 |
| Rh/LSF20 (La$_{0.8}$Sr$_{0.2}$FeO$_3$), 24 | 14.53 | 283, 430 |
| Rh/LM90 (La$_{0.9}$MnO$_3$), 25 | 21.98 | 374 |

Modifications and variations of the present technology will be apparent to those skilled in the art from the forgoing detailed description. All modifications and variations are intended to be encompassed by the following claims. All publications, patents, and patent applications cited herein are hereby incorporated by reference in their entirety.

What is claimed is:

1. A perovskite material, useful for oxygen storage for a three-way catalyst, comprising at least one platinum group metal (PGM) and at least one perovskite compound selected from the group consisting of formula (a): La$_x$FeO$_3$ and formula (b): La$_{(1-y)}$Sr$_y$FeO$_3$,
    wherein:
        x is about 0.7 to about 1.1; and
        y is 0 to about 0.8,
    wherein x and y are independently variables for each one of said perovskite compounds.

2. The perovskite material of claim 1, wherein said PGM is selected from the group consisting of Pt, Pd, and Rh.

3. The perovskite material of claim 2, wherein said PGM is at least one of Pd and Rh.

4. The perovskite material of claim 1, wherein at least one of said perovskite compound has a formula of La$_x$FeO$_3$, wherein x is about 0.9 to about 1.

5. The perovskite material of claim 1, wherein said perovskite compound has a formula of La$_{0.9}$FeO$_3$, La$_{0.6}$Sr$_{0.4}$FeO$_3$, or La$_{0.8}$Sr$_{0.2}$FeO$_3$.

6. The perovskite material of claim 1, wherein said perovskite compound has a formula of La$_{(1-y)}$Sr$_y$FeO$_3$ and y is about 0.2 to about 0.4.

7. The perovskite material of claim 1, wherein said perovskite compound includes La$_x$FeO$_3$.

8. The perovskite material of claim 1, wherein the perovskite compound has a formula of La$_{0.6}$Sr$_{0.4}$FeO$_3$.

9. The perovskite material of claim 1, wherein the perovskite compound has a formula of La$_{0.8}$Sr$_{0.2}$FeO$_3$.

10. An automotive catalytic converter comprising a washcoat, wherein the washcoat comprises at least one perovskite material having at least one platinum group metal (PGM) and at least one perovskite compound selected from the group consisting of formula (a): La$_x$FeO$_3$ and formula (b): La$_{(1-y)}$Sr$_y$FeO$_3$,
    wherein:
        x is about 0.7 to about 1.1; and
        y is 0 to about 0.8,
    wherein x and y are independently variables for each one of said perovskite compounds.

11. The automotive catalytic converter of claim 10, wherein said washcoat comprises a plurality of distinct perovskite materials.

12. The perovskite material of claim 10, wherein said washcoat comprises a plurality of distinct perovskite compounds.

13. The automotive catalytic converter of claim 10, wherein said PGM is selected from the group consisting of Pt, Pd, and Rh.

14. The automotive catalytic converter of claim 13, wherein said PGM is at least one of Pd and Rh.

15. The automotive catalytic converter of claim 10, wherein the at least one of said perovskite compound has a formula of La$_x$FeO$_3$, wherein x is about 0.9 to about 1.

16. The automotive catalytic converter of claim 10, wherein said perovskite compound has a formula of La$_{(1-y)}$Sr$_y$FeO$_3$ and y is about 0.2 to about 0.4.

17. The automotive catalytic converter of claim 10, wherein the perovskite compound has a formula of La$_{0.9}$FeO$_3$.

18. The automotive catalytic converter of claim 10, wherein the perovskite compound has a formula La$_{0.6}$Sr$_{0.4}$FeO$_3$.

19. The automotive catalytic converter of claim 10, wherein said perovskite compound has a formula of La$_{0.8}$Sr$_{0.2}$FeO$_3$.

* * * * *